W. MANNING.
Corn Sheller.

No. 3,208.

2 Sheets—Sheet 1.

Patented Aug. 4, 1843.

W. MANNING.
Corn Sheller.

No. 3,208.

2 Sheets—Sheet 2.

Patented Aug. 4, 1843.

UNITED STATES PATENT OFFICE.

WILLIAM MANNING, OF SOUTH TRENTON, NEW JERSEY.

IMPROVEMENT IN CORN-SHELLERS.

Specification forming part of Letters Patent No. 3,208, dated August 4, 1843.

*To all whom it may concern:*

Be it known that I, WILLIAM MANNING, of South Trenton, in the county of Mercer and State of New Jersey, have invented a new and useful Improvement in a Corn-Shelling Machine; and I do hereby declare that the following is a full, clear, and exact description of the construction and operation of the same, reference being had to the annexed drawings, making a part of this specification, in which—

Figure 1:
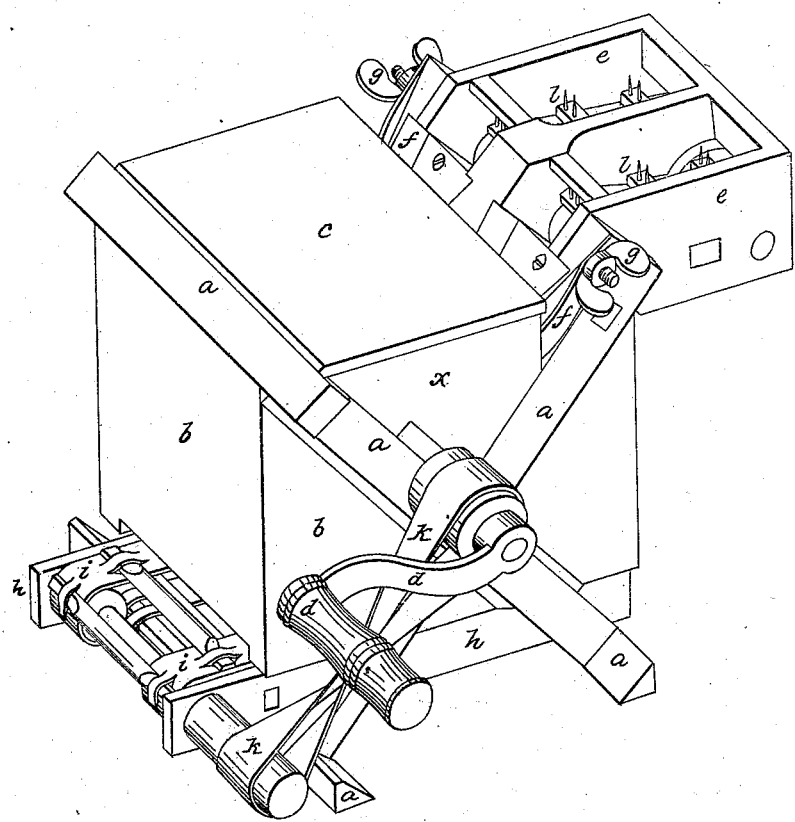
Figure 2:
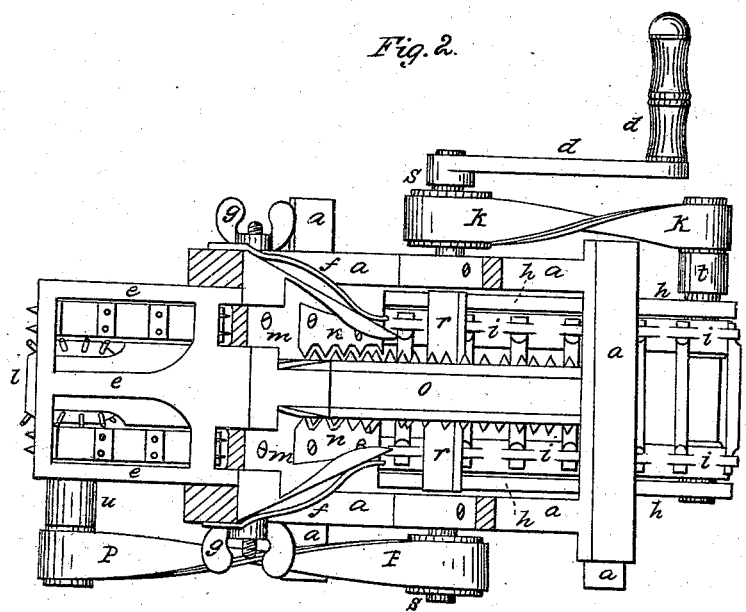

Figure 1 is a perspective view. Fig. 2 is a plan of the machine, and Fig. 3 is a vertical section.

In Fig. 1, the letters $a\ a\ a\ a$ represent the frame-work; $b\ b$, the side and end boarding; $c$, the top, which is movable; $d$, the crank or winch for the moving power upon the main shaft; $e\ e$, the hoppers; $f\ f$, the wooden and steel springs, to keep the corn up to the shelling drum or wheel; $g\ g$, thumb-screws to press the steel springs at pleasure; $h\ h$, the frame for the cob-carrier, which is composed of two drums with leather straps and cross-pieces or net-work of wire to remove the cobs from among the shelled corn under the machine; $k\ k$, the crossed belt for driving the cob-carrier; $l\ l$, blocks with prickers in, attached to belts running on cylinders in the bottom of the hoppers, (which will hereinafter be called "feeders,") driven by pulleys and crossed belt, which is on the farther end of the main shaft.

Fig. 2 is a plan of the machine. $a\ a\ a\ a$ is the frame-work; $d$, the crank; $e\ e\ e$, the hopper; $f\ f\ f\ f$, the springs; $g\ g$, the thumb-screws; $h\ h\ h\ h$, the frame of the cob-carrier; $i\ i\ i\ i$, cob-carrier; $l\ l\ l\ l$, the feeder in the bottom of the hopper; $m\ m$, the inclined floor, which the corn is shelled on; $n\ n$, iron plates screwed on the said floor, with teeth on the edge to prevent the corn from wedging in between the drum and floor; $o$, the shelling drum or wheel, to which are screwed iron segments with pointed teeth. $p\ p$ is a crossed belt which drives the feeders. $r\ r$ is the main shaft, with journals to run in boxes; $s\ s$, pulleys on the main shaft to drive the feeders and cob-carrier; $t$, drum of cob-carrier; $u\ u$, drum of feeder; $k\ k$, the crossed belt to drive the cob-carrier.

Figure 3:
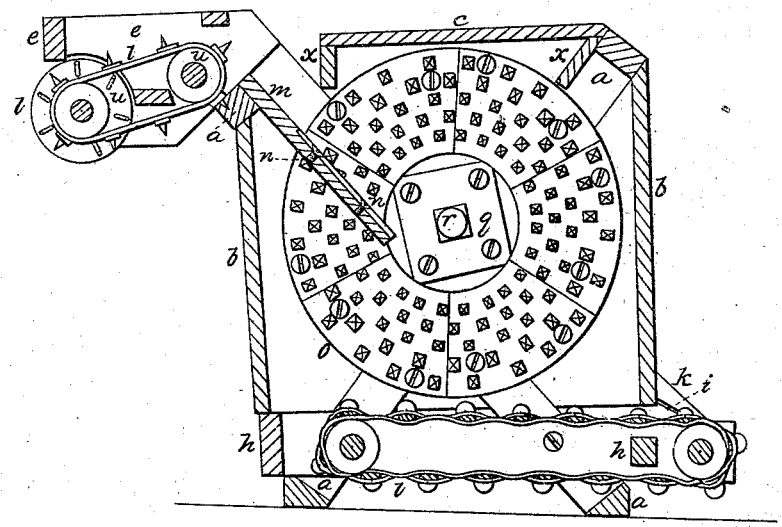

Fig. 3 is a vertical section of the machine. $a\ a\ a\ a$ is the frame-work; $b\ b$, section of the boarding; $c$, the top; $e\ e$, the hopper; $h\ h$, the frame of the cob-carrier; $i\ i$, the cob-carrier; $k$, the belt that drives the cob-carrier; $l\ l\ l$, the feeder; $m$, the inclined floor; $n\ n$, the plates screwed on the said floor; $o$, the shelling-wheel with the toothed segments screwed on. $q$ represents washers on the shaft and screwed to both sides of the wheel to keep it firm to its place on the shaft. $r$ is the main shaft. $t\ t$ are the drums of the cob-carrier. $u\ u$ are the drums of the feeder.

The nature of my improvements to corn-shelling machines consists, first, of making hoppers at one or both ends of the machine with feeders in the bottoms thereof, which draw the ears of corn into the machine; second, of a cob-carrier under the machine, which throws out the cobs from among the shelled corn; third, of making an inclined floor, of wood and iron, between the hoppers and shelling-wheel, which passes the ears of corn through as fast as they can be shelled clean; fourth, of constructing the shelling-wheel with cast-iron plates in cylindric or flat segments, with pointed teeth thereon and screwed to a wooden wheel or cylinder placed on a shaft driven by any of the known powers.

To enable others skilled in the art to make and use my invention, I will proceed to describe its construction and operation.

I construct the frame of my machine by taking four pieces of scantling. I halve two of them together nearly at right angles for one side, and the other two in a similar manner for the other side. Then I take four other pieces and frame two of them onto the side framings across at the bottom, and the other two at or near the top of the side framing, which completes the frame. Then I board up the sides and ends, as is shown in the accompanying drawings.

I make the cover of the machine (which is movable) of boards. $x$, Fig. 1, represents one side fitted between the crossed pieces of scantling on the side of the machine. The other side is similar. $x\ x$, Fig. 3, represent the two narrow ends. $c$, Fig. 1, is the top board, which completes the cover.

The shelling-wheel, which stands in a vertical position, is made of boards or planks, and cast-iron segment-plates with pointed teeth screwed thereon and placed on and secured to an iron shaft (which lies in a horizontal position) by iron washers on each side, well fitted and screwed to the wheel, as is shown in the drawings by $o$, Fig. 2. The shaft must have two journals in the usual way. The boxes must be secured to the side framings by screws or bolts. I place a pulley on one end of the shaft to drive (by a crossed belt, $p$ $p$) the feeder, which may be in a horizontal position, or nearly so, as shown at $l\,l$ in Fig. 3, and which is made by placing two prickers in each wooden block, and securing the blocks by screws to endless belts, which revolve on cylinders $u\,u$, Fig. 3. Near the other end of the shaft I place a pulley, $s$, to drive (by a crossed belt, $k\,k$) the cob-carrier, which is in a horizontal position, as shown at $i\,i\,i$. I first make a frame with two sides, one end, and cross-piece of a proper width to slide in between the legs under the machine. Near each end of this frame is placed a drum or cylinder upon which revolve leather belts with slats of wood across them, or wire-netting or other material that will carry out the cobs and let the shelled corn pass through. On the end of the shaft I place a winch or pulley to suit my driving power, which may be by hand, horse, water, steam, &c.

What I claim as my invention, and desire to secure by Letters Patent, is—

The application to corn-shelling machines of cast or wrought iron plates, (with teeth on their edges,) let in flush with the top surface of the inclined floor and secured thereon by screws, for the purpose of preventing corn from wedging between the wheel and floor, the whole being constructed and operating in the manner above described.

WILLIAM MANNING.

Witnesses:
  I. BRAZER,
  JOHN E. CARVER.